W. YATES.
HINGE.
APPLICATION FILED AUG. 18, 1913.
1,077,447. Patented Nov. 4, 1913.
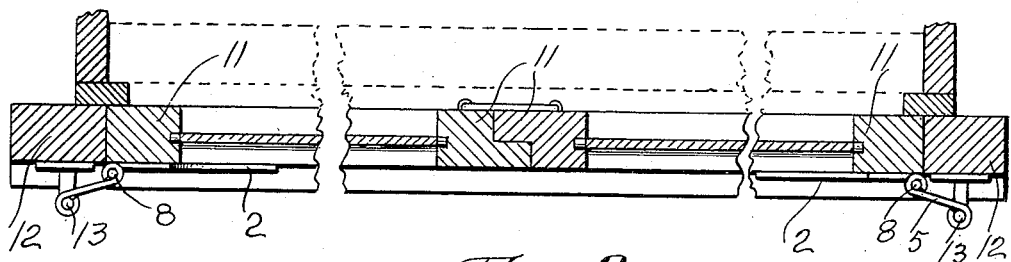
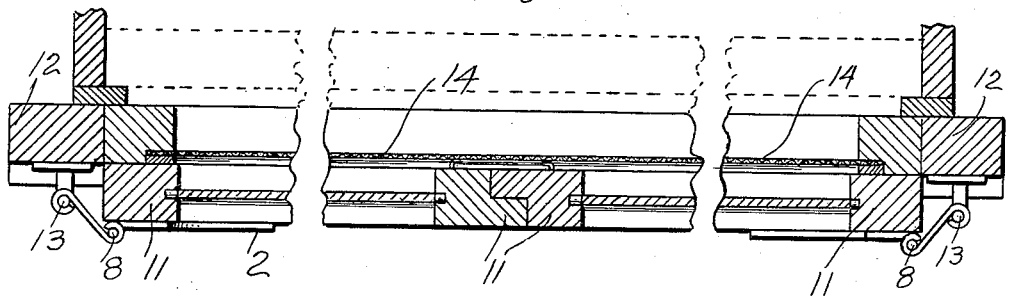
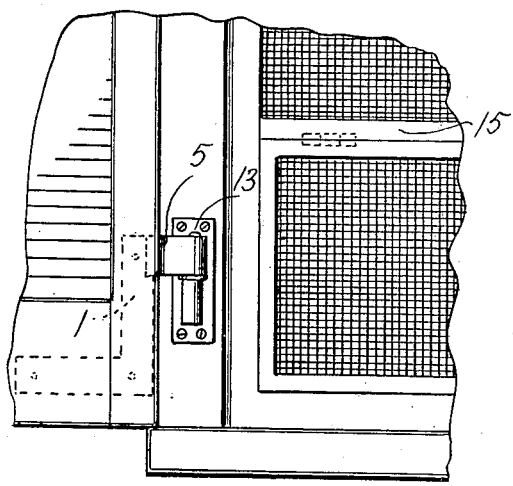
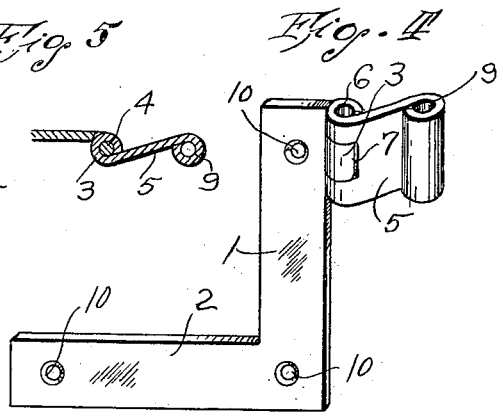
Witnesses
Oscar V. Payne
Joseph W. Powell
Inventor
William Yates
By Parker Cook
Attorney

UNITED STATES PATENT OFFICE.

WILLIAM YATES, OF GLEN ROCK, NEW JERSEY.

HINGE.

1,077,447.     Specification of Letters Patent.     Patented Nov. 4, 1913.

Application filed August 18, 1913. Serial No. 785,293.

*To all whom it may concern:*

Be it known that I, WILLIAM YATES, a citizen of the United States, and a resident of Glen Rock, in the county of Bergen and State of New Jersey, have made and invented certain new and useful Improvements in Hinges, of which the following is a specification.

My invention relates to a new and useful improvement in hinges, and more particularly to hinges especially designed for use with shutters or blinds. Furthermore, it relates to a hinge that will permit the use of shutters or blinds with a casing wherein there is a screen that extends from the top to the bottom thereof, the shutter being positioned outside of the casing in this instance and the shutter capable of swinging within the casing when the screen is removed as is ordinarily the case with the shutters now in use.

Heretofore, as far as I am aware, where the screen extended from the top to the bottom of the casing, it was necessary to leave the shutters in an open position or, in many instances they were entirely removed, or if the pintles extended a sufficient distance from the casing to allow them to be closed when the screen was in place, when the screen was removed the shutters could not swing within the casing formerly occupied by the screen and be flush with the outer surface of the casing. In many instances, it is desirable not only to have the window fully screened, but also to have shutters and be able to close them, as for instance, when the sun is very strong or in case of hard windstorms, etc.

An object therefore of my invention, is to produce a hinge whereby a screen may be used that extends from the top to the bottom of the casing and be flush with the outer surface thereof, and at the same time, support a shutter that may be closed with the said screen in place, and also permit the shutter to swing within the casing, when the screen is not in place, and at the same time, be flush with the outer surface of the same.

Another object, is to provide a hinge that will be capable of use with the ordinary shutters and pintles now in use.

Still another object is to provide a hinge that will be exceedingly simple in construction and of but three parts; one that will be easy to construct, pleasing in appearance and cheap to manufacture.

With these and other ends in view, my invention consists in the new and novel construction and combination of parts as will be hereinafter more fully explained and pointed out in the claims.

Referring now to the drawings, forming a part thereof and embodying the preferred form, Figure 1, is a sectional view of a window casing, with the screen removed and my improved hinge supporting the shutter within the casing. Fig. 2, is likewise a sectional view with the screen however in place within the casing, and the shutter supported by my improved hinge, the shutter however, outside of the casing. Fig. 3, is a broken or fragmentary view of a screen in place, the lower portion being hinged so that the same may be swung back, so that the shutter may be reached from the inside; and showing the hinge supporting the shutter in an open position. Fig. 4, is a detail view in perspective of my improved hinge, and Fig. 5 is a sectional view of my improved hinge.

In the drawings, 1 is the strap of the hinge and is of the usual shape, consisting of the lower arm, and the upper one 2 formed at right angles to the lower one. Of course, these arms may be of different shape or style though I have shown the usual shape or form. It will also be understood that the hinge may be made of sheet or bar metal, or cast if desired. Near the upper end of the arm 2, and on the inner side is formed the tongue 3, and bent to form the knuckle 4. It will be noticed that this knuckle 4, is offset or in a plane at right angles to the surface of the arm 2. This knuckle 4 is thus formed so that it will not interfere with the opening and closing of the shutter which will be hereinafter explained. Secured to arm 2, is a further portion of the hinge 5, which is bent at its inner end 6, to form a similar knuckle but having a portion 7, cut away therefrom, for the reception of the tongue 3, and through both knuckles, is passed the pin 8; thereby forming a hinge or pivotal connection at this point. The outer end of the portion 5 is also bent, forming the knuckle 9, the knuckles however, being formed on the opposite sides of the metal portion 5, the knuckle 9 also being offset or in a different plane than that of the portion 5, and at this point a second hinge or pivotal connection is formed, when placed on a pintle. This portion 5 may be of any width, but the length should be about the width of the frame of the shutter used. Holes for the screws are shown at the points 10 and of course as many may be formed as necessary.

Referring now to the adaptation of the hinge to a shutter and for the purposes previously set forth, in Fig. 1 is clearly shown the shutters 11, closed and within the casing 12, and flush with the outer surface thereof; the knuckles 9 of the hinges passed over the pintles 13, secured to the casing 12, and the arm secured to the shutters. In Fig. 2, the shutters are also shown closed, but within the casing 12 is the screen 14, and the shutters therefor against the outer surface thereof. The hinge in this instance, swings outwardly instead of inwardly, as in Fig. 1, this being possible in view of the hinge having two hinge or pivotal connections.

By providing the knuckles offset on both the arm 2, and the portion 5, the shutter in no way interferes with the action of the hinge with the shutter in either position, Figs. 1 and 2, which would not be the case if the knuckles were in the same plane of each respective portion; and clearance is further provided by arranging the knuckles on the opposite sides of the metal portion 5.

In the fragmentary view, the lower portion of the screen 14 is shown hinged at 15 so that the shutters may be closed from the inside and the hinge is clearly shown in its open position.

The pintle should be so placed on the casing, that when the hinge swings, the pintle 13 will be the center of the circle formed by the arc of the pin 8, swinging from its closed position within the sash to its closed position without the sash.

From the foregoing it will be seen that with the improved hinge, the shutters may be swung to a closed position, if for any reason desired, even if a screen is in place and flush with the outside of the casing, or if there is no occasion for screens owing to the season of the year, the shutters may be closed if desired, and at the same time fit wholly within the casing.

Having thus described my invention, what I claim as new and desire to secure by Letters Patent, is:

1. A hinge, comprising an arm having a knuckle formed on one edge thereof; a member having a knuckle formed on one end thereof, adapted to register with the knuckle aforesaid, the other end of said member also formed with a knuckle, adapted to pass over a pintle and means for retaining the knuckle of said arm and the inner knuckle of said member in their registered position.

2. In a hinge, an arm having a knuckle on one edge thereof, said knuckle being in an offset position; a member provided with knuckles at its opposite ends, said knuckles also being in an offset position and means for pivotally connecting the knuckle of the arm and one of the knuckles of said member and retaining the same in their registered position.

Signed at Glen Rock, in the county of Bergen, and State of New Jersey, this 15th day of August, 1913.

WILLIAM YATES.

Witnesses:
G. K. CRAWFORD,
JOHN C. KOUGH.

Copies of this patent may be obtained for five cents each, by addressing the "Commissioner of Patents, Washington, D. C."